United States Patent
Vickers, Jr.

(10) Patent No.: US 11,137,240 B1
(45) Date of Patent: Oct. 5, 2021

(54) PIPE ALIGNMENT TOOL

(71) Applicant: Kenneth Richard Vickers, Jr., Queen Creek, AZ (US)

(72) Inventor: Kenneth Richard Vickers, Jr., Queen Creek, AZ (US)

(73) Assignee: Kenneth Richard Vickers, Queen Creek, AZ (US)

( * ) Notice: Subject to any disclaimer, the term of this patent is extended or adjusted under 35 U.S.C. 154(b) by 258 days.

(21) Appl. No.: 16/602,093

(22) Filed: Aug. 4, 2019

(51) Int. Cl.
*G01B 5/25* (2006.01)
*F16L 13/02* (2006.01)

(52) U.S. Cl.
CPC ............... *G01B 5/25* (2013.01); *F16L 13/02* (2013.01); *F16L 2201/00* (2013.01)

(58) Field of Classification Search
CPC ......... G01B 5/25; F16L 2201/00; F16L 13/02
USPC ......................................................... 33/412
See application file for complete search history.

(56) References Cited

U.S. PATENT DOCUMENTS

| | | | | |
|---|---|---|---|---|
| 4,216,587 A * | 8/1980 | Stone | ................. | G01B 5/25 33/661 |
| 4,343,093 A * | 8/1982 | Eadens | ................. | G01C 9/28 24/299 |
| 4,413,415 A * | 11/1983 | Stovall | ................. | G01B 5/25 269/43 |
| 6,505,412 B2 * | 1/2003 | Hauzie, Jr. | ............. | G01B 3/563 33/1 N |
| 6,834,435 B2 * | 12/2004 | Turner | ................. | G01C 9/28 33/370 |
| 2002/0092191 A1 * | 7/2002 | Hauzie, Jr. | ............... | G01B 5/25 33/529 |
| 2002/0133960 A1 * | 9/2002 | Cross | ................. | G01B 5/24 33/412 |
| 2007/0214670 A1 * | 9/2007 | Wrzyszczynski | ..... | E21B 33/035 33/412 |
| 2020/0254589 A1 * | 8/2020 | Roberts | ................. | B25B 5/147 |

* cited by examiner

*Primary Examiner* — Yaritza Guadalupe-McCall
(74) *Attorney, Agent, or Firm* — Dragon Sun Law Firm, PC; Jinggao Li, Esq.

(57) ABSTRACT

A pipe alignment tool for aligning a pair of pipes is disclosed. The tool includes an anchor member configured to abut the pair of pipes and a spindle coupled to the anchor member. The tool further includes a block in threaded engagement with the spindle and adapted to move axially along an axis of the spindle in response to a rotation of the spindle about the axis. The block includes a first retention structure and a second retention structure. Furthermore, the tool includes a flexible member for supporting the pair of pipes and adapted to be disposed around the pair of pipes and engaged with the first retention structure and the second retention structure. The flexible member is tightened about the pipes upon the rotation of the spindle in a first direction, wherein the tightening of the flexible member facilitates the alignment of the pair of pipes.

9 Claims, 4 Drawing Sheets

PIPE ALIGNMENT TOOL

TECHNICAL FIELD

The present disclosure relates, generally, to a pipe alignment tool. More particularly, the present disclosure relates to a pipe alignment tool suitable for aligning two pipes.

BACKGROUND

In chemical and power plants a pipeline is formed by welding straight pipes together. For welding the pipes, the pipes need to be in proper alignment as misaligned pipes at the joint tend to develop a leakage, Therefore, a system or a tool is needed for aligning the pipes.

SUMMARY

The present disclosure provides a pipe alignment tool for aligning a pair of pipes. The pipe alignment tool includes an anchor member configured to abut the pair of pipes and a spindle coupled to the anchor member. The pipe alignment tool further includes a block in threaded engagement with the spindle and adapted to move axially along an axis of the spindle in response to a rotation of the spindle about the axis. The block includes a first retention structure and a second retention structure. Furthermore, the pipe alignment tool includes a flexible member for supporting the pair of pipes and adapted to be disposed around the pair of pipes and engaged with the first retention structure and the second retention structure. The flexible member is tightened about the pipes upon the rotation of the spindle in a first direction, wherein the tightening of the flexible member facilitates the alignment of the pair of pipes.

DETAILED DESCRIPTION

Figure 1:
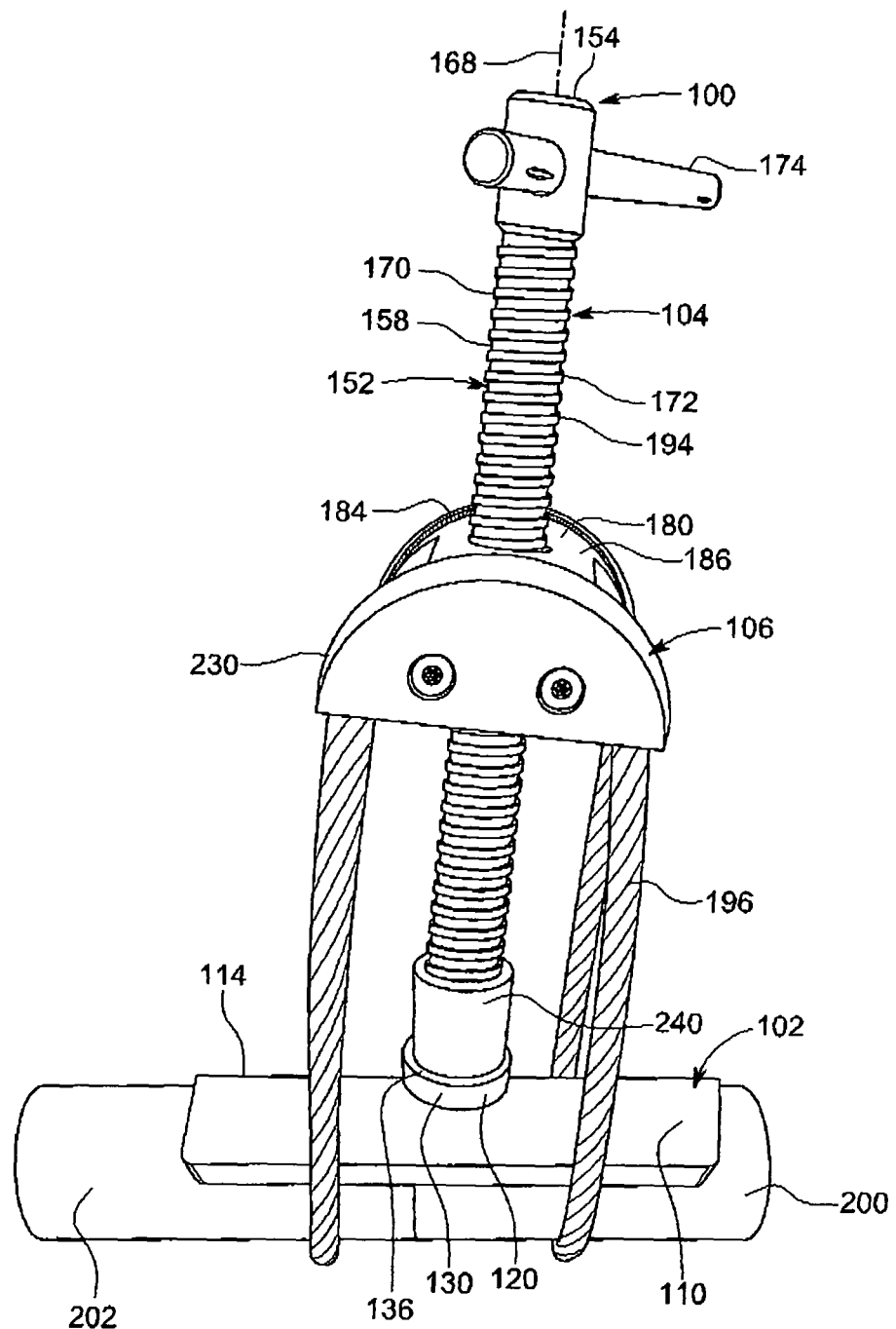
FIG. 1 illustrates a front perspective view of a pipe alignment tool engaged with a pair of pipes, in accordance with an embodiment of the disclosure.
Figure 2:
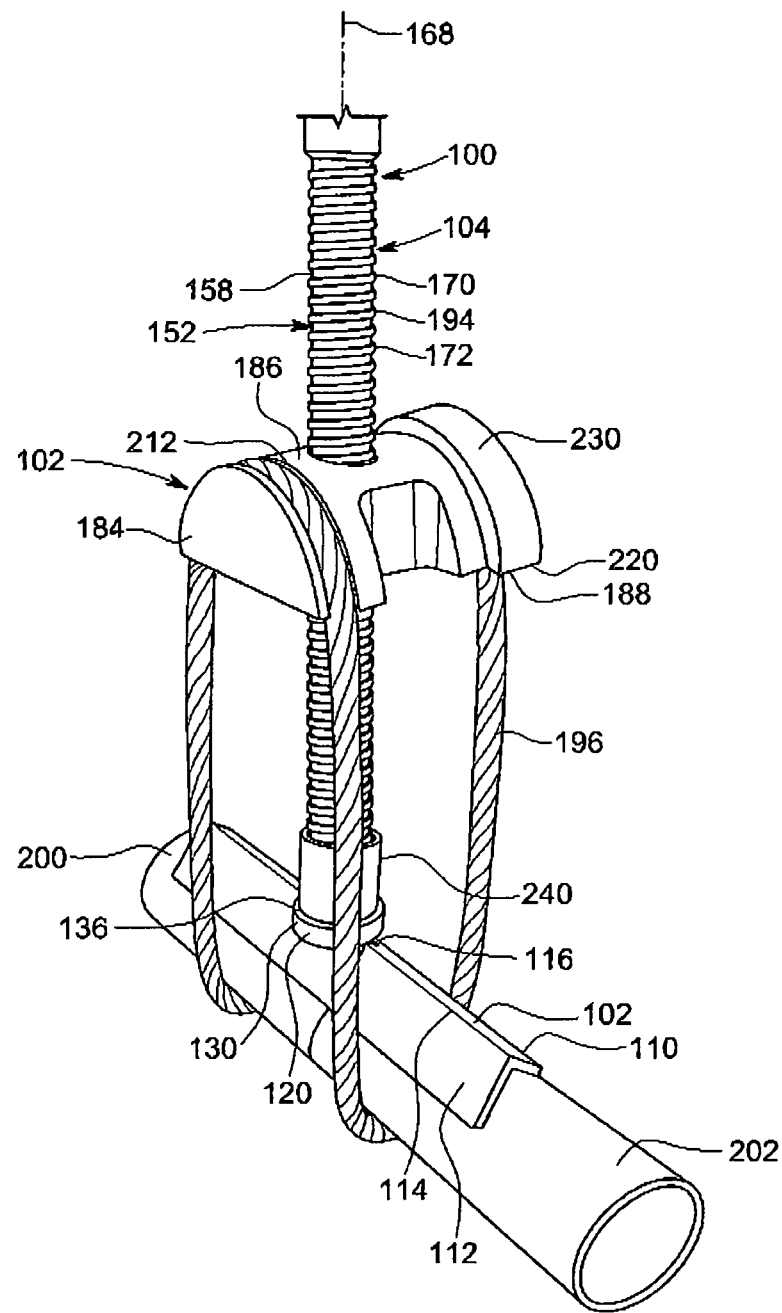
FIG. 2 illustrates a side perspective view of the pipe alignment tool engaged with the pair of pipes, in accordance with an embodiment of the disclosure.
Figure 3:
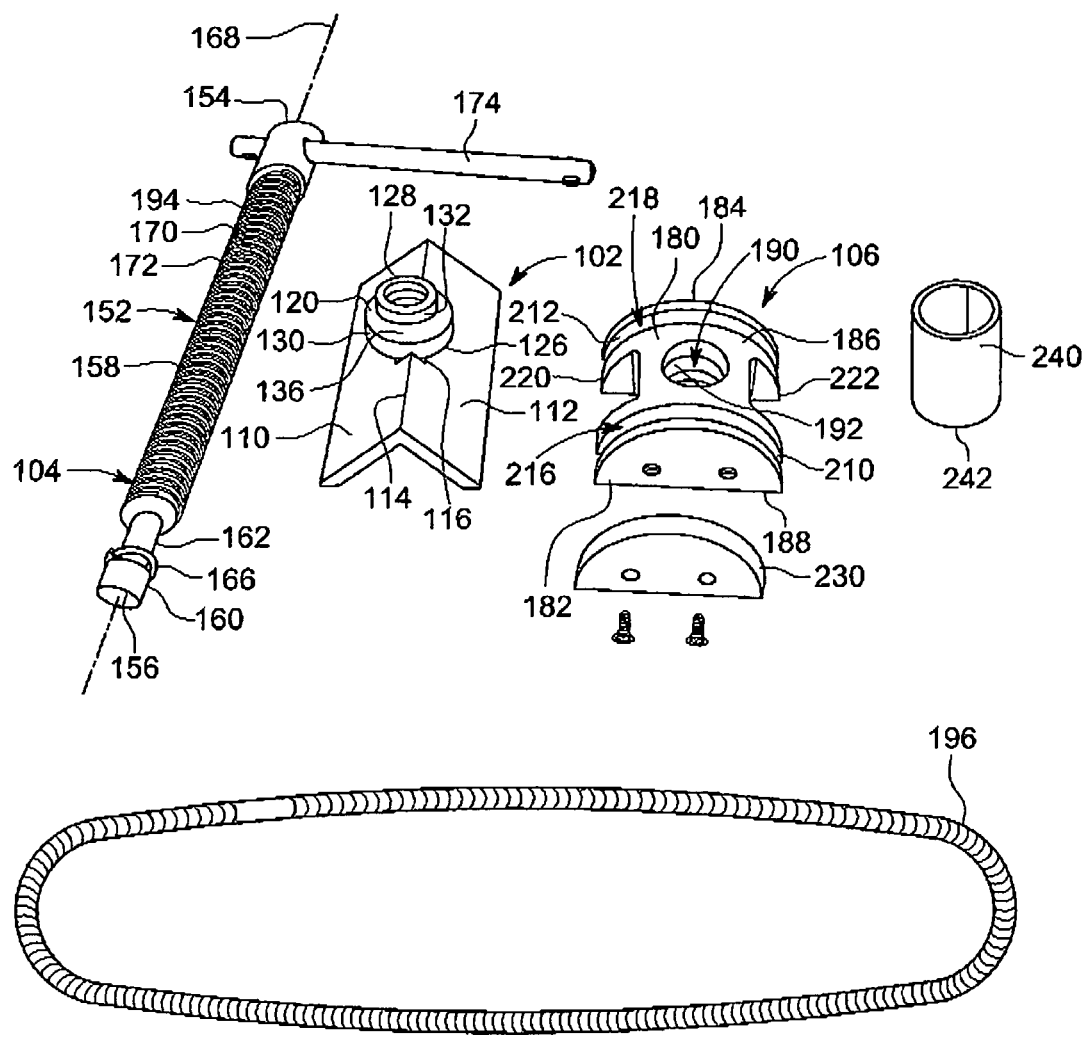
FIG. 3 illustrates various components of the pipe alignment tool, in accordance with an embodiment of the disclosure.
Figure 4:
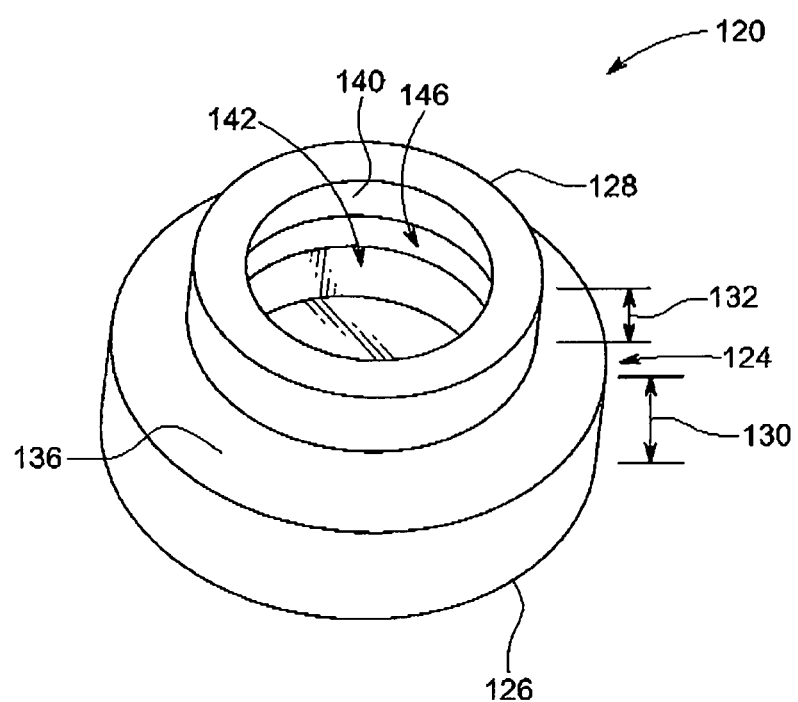
FIG. 4 illustrates a perspective view a coupler of the pipe alignment tool, in accordance with an embodiment of the disclosure.

Referring to FIGS. 1 and 2, an exemplary pipe alignment tool 100 (hereinafter referred to as tool 100) attached to a pair of pipes, for example, a first pipe 200 and a second pipe 202, for aligning confronting ends of the pipes 200, 202 is shown. Referring to FIGS. 1 to 3, the tool 100 includes an anchor member 102 adapted to be positioned abutting the pair of pipes 200, 202, a spindle 104 coupled to the anchor member 102, and a block 106 threadably engaged with the spindle 104. As shown, the anchor member 102 may include a first plate 110 and a second plate 112 (shown in FIG. 2) connected to the first plate 110 and may be disposed at an angle relative to the first plate 110. In an embodiment, the angle between the first plate 110 and the second plate 112 may be 90 degrees. Further, the anchor member 102 may include an edge 114 defined at an interface of the first plate 110 and the second plate 112. In an embodiment, the first plate 110 and the second plate 112 contact/abut the pipes 200, 202 when the tool 100 is engaged with the pipes 200, 202. Further, the anchor member 102 may include one or more cutouts 116 defined at the edge 114, The cutouts 116 may facilitate a coupling of the spindle 104 with the anchor member 102. In an embodiment, the tool 100 may include a coupler 120 for coupling/attaching/engaging the spindle 104 with the anchor member 102. In such a case, the coupler 120 is partially received and may be welded within the cutout 116.

Referring to FIGS. 1 to 4, the coupler 120 may include a cylindrical body 124 having a first end 126 coupled to the anchor member 102, a second end 128, a first portion 130, and a second portion 132 extending from the first portion 130 to the second end 128. The first portion 130 extends from the first end 126 to the second portion 130, and may include an outer diameter larger than an outer diameter of the second portion 132. Accordingly, a step 136 is defined at an interface of the first portion 130 and the second portion 132, Further, the second portion 132 includes an inner surface 140 defining a bore 142 extending from the second end 128 to the first portion 130. Further, a groove 146 is defined along the inner surface 140 extending inside the body 124 in a radial direction from the inner surface 140, The groove 146 facilitates a locking of the spindle 104 with the coupler 120.

The spindle 104 may include an elongated body 152 having a first longitudinal end 154, a second longitudinal end 156, a first portion 158 extending from the first longitudinal end 154 towards the second longitudinal end 156, a second portion 160 extending from the second longitudinal end 156 towards the first longitudinal end 154, and a third portion 162 disposed between the first portion 158 and the second portion 160 and extending from the first portion 158 to the second portion 160, Accordingly, the first portion 158 may extend from the first longitudinal end 154 to the third portion 162, while the second portion 160 may extend from the second longitudinal end 156 to the third portion 162, As shown, a diameter of the third portion 162 is smaller than a diameter of the first portion 158 and a diameter of the second portion 160. In an assembly of the spindle 104 with the coupler 120, the second portion 160 is disposed inside the bore 142 and abut the first portion 130 of the coupler 120, while the third portion 162 may be disposed, at least partly, inside the bore 142 and is engaged/coupled/attached with the coupler 120. To facilitate an engagement and retention of the spindle 104 with the coupler 120, the tool 100 may include a lock key 166 disposed around the third portion 162 of the spindle 104. The lock key 166 may be a circlip and is inserted, at least partly, inside the groove 146 of the coupler 120 to engage the spindle 104 with the coupler 120. The lock key 166 engages the spindle 104 with the coupler 120 such that spindle 104 may rotate about an axis 168 of the spindle 104, while preventing a linear movement of the spindle 104 along the axis 168. Further the first portion 158 may include a threaded structure 170 defined along an outer surface 172 of the first portion 158. The threaded outer surface 172 facilitates the threaded engagement of the spindle 104 and the block 106. Also, the spindle 104 may include a handle 174 attached to the first longitudinal end 154 to facilitate a rotation of the spindle 104 about the axis 168.

The block 106 may include a semi-cylindrical body 180 having a first lateral end 182, a second lateral end 184, a first surface 186 (hereinafter referred to as curved surface 186) extending from the first lateral end 182 to the second lateral end 184, and a substantial flat surface 188 (i.e. a second surface 188) disposed opposite to the curved surface 186 and extending from the first lateral end 182 to the second lateral end 184. To enable an engagement of the block 106 with the threaded outer surface 172, the block 106 includes a threaded bore 190 extending through the body 180 from the curved surface 186 to the flat surface 188. The spindle 104 and the block 106 are engaged to each other in such a manner that the spindle 104 passes through the threaded bore 190 and threads 192 of the threaded bore 190 are in engagement with threads 194 of the spindle 104. Further, the block 106 is adapted to move linearly along the axis 168 upon a rotation of the spindle 104. In an embodiment, the block 106 moves towards the pipes 200, 202 when the spindle 104 is rotated in the first direction, while the block 106 moves away from the pipes 200, 202 upon a rotation of the spindle 104 in the second direction. A movement of the block 106 away from the pipes 200, 202 facilitates an alignment of the pipes 200, 202.

To facilitate the alignment of pipes 200, 202, the tool 100 includes a flexible member 196 coupled to the block 106 and the pipes 200, 202. For facilitating an engagement and retention of the flexible member 196 with the block 106, the block 106 may include a first retention structure 210 and a second retention structure 212. In an implementation, the first retention structure 210 may be a first groove 216 defined by the curved surface 186 and disposed proximate to the first lateral end 182, while the second retention structure 212 may be a second groove 218 defined by the curved surface 186 and disposed proximate to the second lateral end 184. In an embodiment, the first groove 216 and the second groove 218 may be substantially parallel to each other, and may extend from a first edge 220 of the body 180 to a second edge 222 of the body 180 along the circumference or periphery of the curved surface 186 (i.e. the body 180). As shown, the first edge 220 and the second edge 222 are defined at an interface of the curved surface 186 with the flat surface 188 and extending from the first lateral end 182 to the second lateral end 184. Further, the first groove 216 is adapted to receive and hold a portion of the flexible member 196 and the second groove 218 is adapted to receive and hold another portion of the flexible member 196. In an embodiment, the block 106 may include a cover 230 removably coupled to the first lateral end 182 of the body 180. In an embodiment, the cover 230 is engaged with the body 180 such that the flexible member 196 is disposed between the body 180 and the cover 230 and facilitates a retention of the portion of the flexible member 196 within the first groove 216. Optionally, in certain embodiments, the block 106 may include a second cover attached to the second lateral end 184.

The flexible member 196 is adapted to support the first pipe 200 and the second pipe 202, and may include a hoop shape, and thereby partially surrounds and abuts both the first pipe 200 and the second pipe 202. In an embodiment, flexible member 196 may be a flexible cable. In an embodiment, the flexible member 196 may be a chain. Alternatively, the flexible member 196 may be a wire rope. Further, additionally, and optionally, the tool 100 may include a guide member 240 that may be welded to the coupler 120 and configured to abut the step 136 of the coupler 120, and partially, surround the spindle 104, As shown, the guide member 240 may be a hollow cylinder may facilitate a retention of the spindle 104 with the coupler 120. In an assembly, the second portion 132 of the coupler 120 may be disposed inside the guide member 240 and an end 242 of the guide member 240 may abut the step 136. Further, it may be appreciated that the one or more components of the tool 100 may be made of one or more materials, such as, but not limited to, carbon steel, stainless steel, aluminum, titanium, cast iron, cast steel, etc.

An operation of the tool 100 is now explained. For aligning the first pipe 200 and the second pipe 202, a technician, at first, may position anchor member 102 abutting the first pipe 200 and the second pipe 202 such that the edge 114 is disposed away or at a distance from the pipes 200, 202 and the plates 110, 112 abuts the pipes 200, 202. Thereafter, the flexible member 196 is positioned around the first pipe 200 and the second pipe 200 for supporting the two pipes 200, 202, Thereafter, a portion of the flexible member 196 is inserted the inside the first groove 216, while another portion of the flexible member 196 is inserted inside the second groove 218. In this manner, the flexible member 196 facilitates the engagement of the pipes 200, 202 with the block 106. Upon inserting the flexible member 196 inside the first groove 216, the technician may attach the cover 230 to the first lateral end 182 of the body 180, thereby retaining a portion of the flexible member 196 inside the first groove 216. Subsequently, the technician may operate the handle 174 and rotates the spindle 104 about the axis 168 in the first direction. In response to the rotation of the spindle 104 in the first direction, the block 106 moves linearly along the spindle 104 in a direction away from the anchor member 102 and the pipes 200, 202. Accordingly, the flexible member 196 is tightened and exert force on both the pipes 200, 202 to move the first pipe 200 and/or the second pipe 202 in a direction towards the anchor member 102. In this manner, the tool 100 aligns the first pipe 200 and the second pipe 202. Further, for removing the tool 100 from the pipes 200, 202, the technician may rotate the spindle 104 in the second direction opposite to the first direction. In so doing, the block 106 moves linearly along the axis 168 towards the pipes 200, 202. Accordingly, the flexible member 196 may become loose. Subsequently, the flexible member 196 may be removed from the pipes 200, 202 by disengaging the flexible member 196 from the first groove 216 and the second groove 218. In this manner, the tool 100 is disengaged from the pipes 200, 202 after alignment of the pipes 200, 202.

LIST OF ELEMENTS 100 pipe alignment tool
102 anchor member
104 spindle
106 block
110 first plate
112 second plate
114 edge
116 cutout
120 coupler
124 body
126 first end
128 second end
130 first portion
132 second portion
136 step
140 inner surface
142 bore
146 groove
152 elongated body
154 first longitudinal end
156 second longitudinal end
158 first portion
160 second portion
162 third portion 166 lock key
168 axis
170 threaded structure
172 outer surface
174 handle
180 body
182 first lateral end
184 second lateral end
186 curved surface
188 flat surface
190 threaded bore
192 threads
194 threads
196 flexible member
200 first pipe
202 second pipe
210 first retention structure
212 second retention structure
216 first groove
218 second groove
220 first edge
222 second edge
230 cover
240 guide member
242 end

What is claimed is:

1. A pipe alignment tool for aligning a pair of pipes, the pipe alignment tool comprising:
   an anchor member configured to abut the pair of pipes;
   a spindle coupled to the anchor member;
   a block in threaded engagement with the spindle and adapted to move axially along an axis of the spindle in response to a rotation of the spindle about the axis, the block includes a first lateral end, a second lateral end, a first groove arranged proximate to the first lateral end and a second groove arranged proximate to the second lateral end; and
   a flexible member for supporting the pair of pipes and adapted to be disposed around the pair of pipes and extend inside the first groove and the second groove; wherein the flexible member is tightened about the pipes upon the rotation of the spindle in a first direction, wherein the tightening of the flexible member facilitates the alignment of the pair of pipes.

2. The pipe alignment tool of claim 1 further including a handle attached to the spindle for rotating spindle about the axis.

3. The pipe alignment tool of claim 1 further including a coupler for attaching the spindle with the anchor member.

4. The pipe alignment tool of claim 3, wherein, the coupler defines a bore for receiving a portion of the spindle, wherein a spindle is attached to the coupler such that the spindle is adapted to rotate relative to the coupler.

5. The pipe alignment tool of claim 3 further including a lock key for locking the coupler with the spindle and preventing an axial motion of the spindle relative to the coupler.

6. The pipe alignment tool of claim 1, wherein the first groove and second groove are disposed substantially parallel to each other.

7. The pipe alignment tool of claim 1, wherein the block includes a semi-cylindrical shape, and the first groove and the second groove extend along a circumference of the block.

8. The pipe alignment tool of claim 1, wherein the block defines a threaded bore for receiving the spindle and extending from a first surface of the block to a second surface of the block.

9. The pipe alignment tool of claim 8, wherein the spindle includes a threaded outer surface adapted to engage with the threaded bore of the block.

* * * * *